US008315936B2

(12) United States Patent
Stubbs et al.

(10) Patent No.: US 8,315,936 B2
(45) Date of Patent: Nov. 20, 2012

(54) IDENTIFYING AND COMPENSATING FOR MODEL MIS-SPECIFICATION IN FACTOR RISK MODELS

(75) Inventors: Robert A. Stubbs, Roswell, GA (US); Stefan Hans Schmieta, Marietta, GA (US)

(73) Assignee: Axioma, Inc., New York, NY (US)

( * ) Notice: Subject to any disclaimer, the term of this patent is extended or adjusted under 35 U.S.C. 154(b) by 251 days.

(21) Appl. No.: 12/711,554

(22) Filed: Feb. 24, 2010

(65) Prior Publication Data

US 2010/0153307 A1 Jun. 17, 2010

Related U.S. Application Data

(63) Continuation of application No. 11/668,294, filed on Jan. 29, 2007, now Pat. No. 7,698,202.

(60) Provisional application No. 60/763,855, filed on Jan. 31, 2006.

(51) Int. Cl.
*G06Q 40/00* (2012.01)
(52) U.S. Cl. ............................. 705/36 R; 705/37; 705/35
(58) Field of Classification Search ............... 705/35–37
See application file for complete search history.

(56) References Cited

U.S. PATENT DOCUMENTS

| 2002/0178101 | A1* | 11/2002 | Swift ............................. 705/36 |
| 2002/0184133 | A1* | 12/2002 | Zangari et al. ................. 705/36 |
| 2004/0078319 | A1* | 4/2004 | Madhavan et al. ............. 705/38 |
| 2005/0065754 | A1* | 3/2005 | Schaf et al. .................... 702/188 |
| 2005/0080704 | A1* | 4/2005 | Erlach et al. .................... 705/36 |
| 2007/0033123 | A1* | 2/2007 | Navin ............................. 705/35 |

OTHER PUBLICATIONS

"Determining the number of factors in approximate factor models"; Joshua Bai and Serena Ng; Econometrica, vol. 70, No. 1, Jan. 2002 (herein after NPL1).*

(Continued)

*Primary Examiner* — Hani M Kazimi
*Assistant Examiner* — Abhishek Vyas
(74) *Attorney, Agent, or Firm* — Law Offices of Peter H. Priest, PLLC

(57) ABSTRACT

Techniques for more accurately estimating the risk, or active risk, of an investment portfolio when using factor risk models are disclosed. This improved accuracy is achieved by identifying and compensating for the inherent "modeling error" present when risk is represented using a factor risk model. The approach adds one or more factors that depend on the investment portfolio and that explicitly compensate for factors that are unspecified or unattributed in the original factor risk model. These unspecified factors of the original factor risk model lead to modeling error in the original factor risk model. The approach can be used with a variety of different factor risk models, such as, fundamental, statistical and macro risk models, for example, and for a variety of securities, such as equities, international equities, composites, exchange traded funds (ETFs), or the like, currencies, and fixed-income, for example. The risk associated with modeling error in a factor risk model relative to a particular portfolio is identified and quantified. Knowledge of this risk associated with modeling error can be utilized when estimating risk, or active risk, using factor risk models or when constructing optimal portfolios by mean-variance optimization or other portfolio construction strategies and procedures that make use of factor risk models.

5 Claims, 5 Drawing Sheets

OTHER PUBLICATIONS

Im, Eun-Jin (2000). Optimizing the performance of sparse matrix-vector multiplication. Ph.D. dissertation, University of California, Berkeley, United States—California. Retrieved Jun. 11, 2012, from Dissertations & Theses: Full Text.(Publication No. AAT 9979665).*

Ralf Östermark. (2005). Dynamic portfolio management under competing representations. Kybernetes, 34(Sep. 2010), 1517-1550. Retrieved Jun. 11, 2012, from Research Library. (Document ID: 933101261).*

Michael J Best, & Jaroslava Hlouskova. (2005). An Algorithm for Portfolio Optimization with Transaction Costs. Management Science, 51(11), 1676-1688. Retrieved Jun. 11, 2012, from ABI/INFORM Global. (Document ID: 931248841).*

* cited by examiner

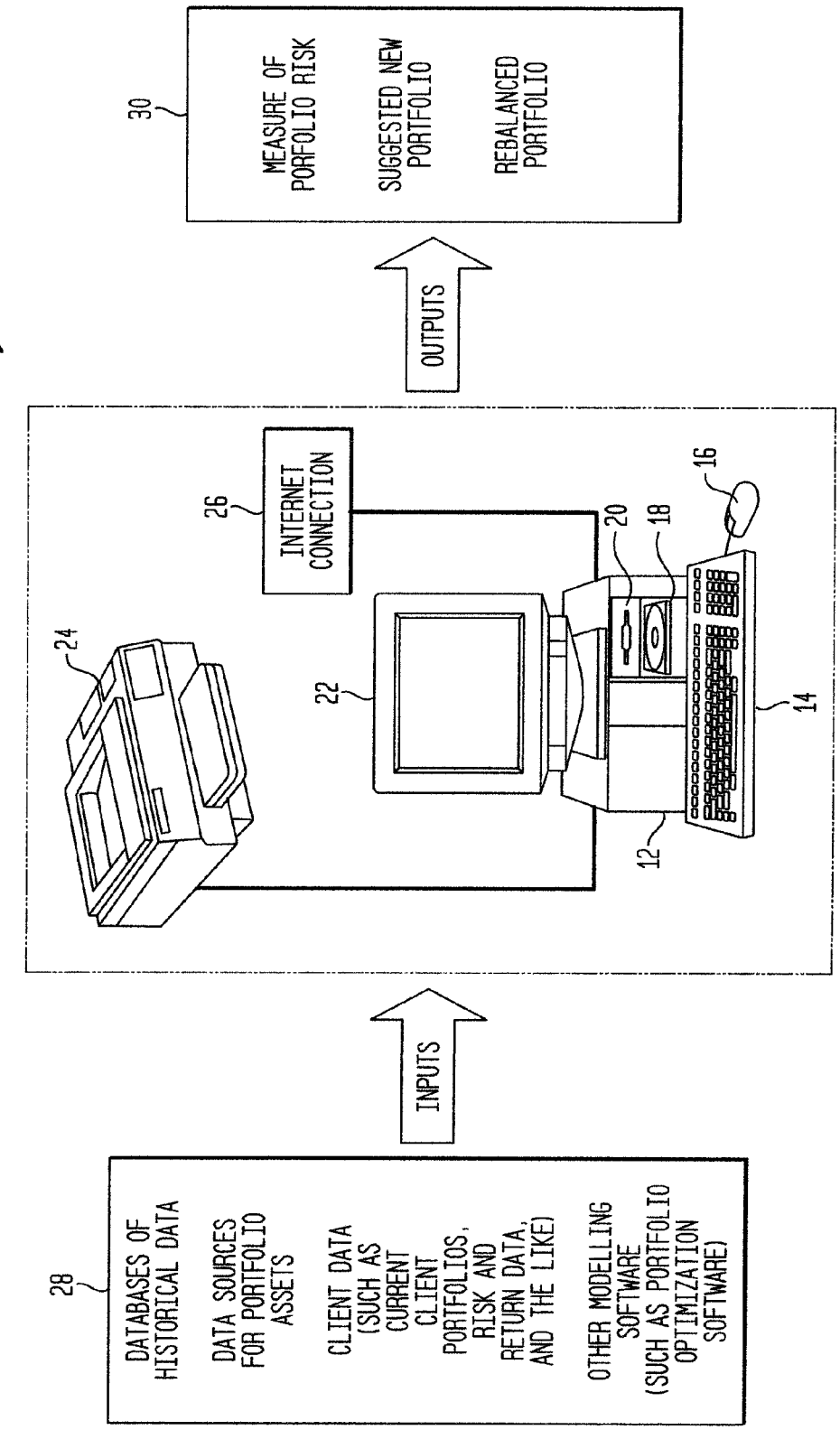

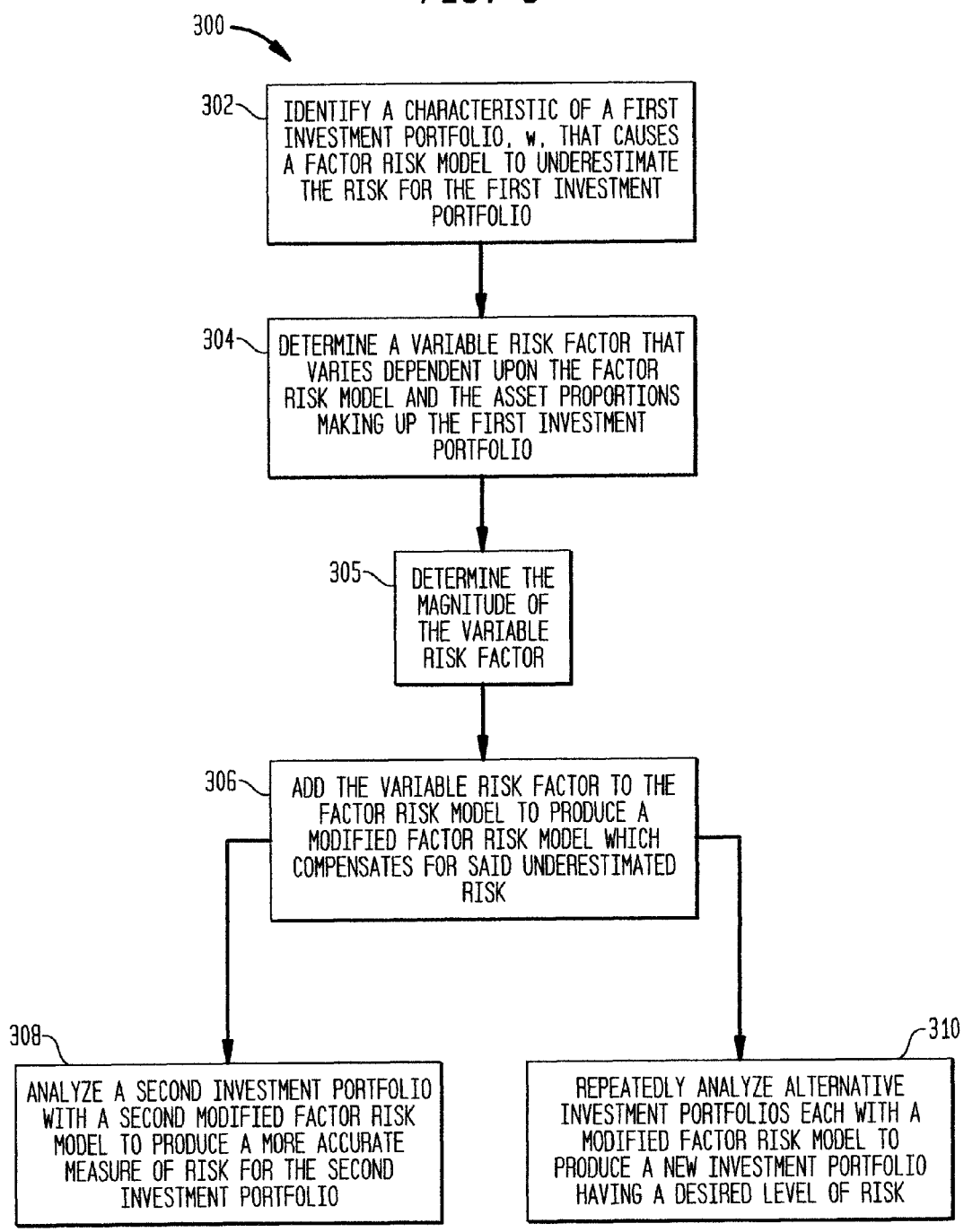

| NO ADJUSTMENT | | ONE FACTOR ADJUSTMENT | |
|---|---|---|---|
| TICKER | HOLDINGS | TICKER | HOLDINGS |
| PEG | 1.84% | VLO | 0.51% |
| BXP | 1.39% | MOD | 0.48% |
| CEI | 1.13% | GVA | 0.46% |
| ... | | ... | |
| CNA | -1.26% | XRX | -0.63% |
| AIV | -3.77% | AIV | -0.70% |

| TICKER | HOLDINGS WITH NO ADJUSTMENT | HOLDINGS WITH ADJUSTMENT |
|---|---|---|
| PEG | 1.84% | 0.39% |
| BXP | 1.39% | 0.25% |
| CEI | 1.13% | 0.32% |
| ED | 1.10% | 0.32% |
| FCE/A | 0.95% | 0.37% |
| TXU | 0.87% | 0.002% |
| ... | ... | ... |
| HCP | -1.00% | -0.35% |
| AYE | -1.01% | -0.25% |
| NYB | -1.03% | -0.58% |
| CNA | -1.26% | -0.51% |
| AIV | -3.77% | -0.70% |

430     440

IDENTIFYING AND COMPENSATING FOR MODEL MIS-SPECIFICATION IN FACTOR RISK MODELS

The present application is a continuation of U.S. Ser. No. 11/668,294 filed Jan. 29, 2007 and claims the benefit of U.S. Provisional Application Ser. No. 60/763,855 filed Jan. 31, 2006 which is incorporated by reference herein in its entirety.

FIELD OF INVENTION

The present invention relates generally to the estimation of the risk, or active risk, of an investment portfolio using factor risk models. More particularly, it relates to improved computer-based systems, methods and software for more accurate estimation of the risk, or active risk, of an investment portfolio by identifying and incorporating into the factor risk model a correction whose magnitude depends on the investment portfolio and strategy. The correction quantifies and compensates for unspecified factors in factor risk models which inherently produce modeling error.

BACKGROUND OF THE INVENTION

There are several well known mathematical modeling techniques for estimating the risk of a portfolio of financial assets such as securities and for deciding how to strategically invest a fixed amount of wealth given a large number of financial assets in which to potentially invest.

For example, mutual funds often estimate the active risk associated with a managed portfolio of securities, where the active risk is the risk associated with portfolio allocations that differ from a benchmark portfolio. Often, a mutual fund manager is given a "risk budget", which defines the maximum allowable active risk that he or she can accept when constructing a managed portfolio. Active risk is also sometimes called portfolio tracking error. Portfolio managers may also use numerical estimates of risk as a component of performance contribution, performance attribution, or return attribution, as well as, other ex-ante and ex-post portfolio analyses. See for example, R. Litterman, Modern Investment Management: An Equilibrium Approach, John Wiley and Sons, Inc., Hoboken, N.J., 2003 (Litterman), which gives detailed descriptions of how these analyses make use of numerical estimates of risk and which is incorporated by reference herein in its entirety.

Another use of numerically estimated risk is for optimal portfolio construction. One example of this is mean-variance portfolio optimization as described by H. Markowitz, "Portfolio Selection", Journal of Finance 7(1), pp. 77-91, 1952 which is incorporated by reference herein in its entirety. In mean-variance optimization, a portfolio is constructed that minimizes the risk of the portfolio while achieving a minimum acceptable level of return. Alternatively, the level of return is maximized subject to a maximum allowable portfolio risk. The family of portfolio solutions solving these optimization problems for different values of either minimum acceptable return or maximum allowable risk is said to form an "efficient frontier", which is often depicted graphically on a plot of risk versus return. There are numerous, well known, variations of mean-variance portfolio optimization that are used for portfolio construction. These variations include methods based on utility functions, Sharpe ratio, and value-at-risk.

Such portfolio construction procedures make use of an estimate of portfolio risk, and some make use of an estimate of portfolio return. A crucial issue for these optimization procedures is how sensitive the constructed portfolios are to changes in the estimates of risk and return. Small changes in the estimates of risk and return occur when these quantities are re-estimated at different time periods. They also occur when the raw data underlying the estimates is corrected or when the estimation method itself is modified. Mean-variance optimal portfolios are known to be sensitive to small changes in the estimated asset return, variances, and covariances. See, for example, J. D. Jobson, and B. Korkei, "Putting Markowitz Theory to Work", Journal of Portfolio Management, Vol. 7, pp. 70-74, 1981 and R. O. Michaud, "The Markowitz Optimization Enigma: Is Optimized Optimal?", Financial Analyst Journal, 1989, Vol. 45, pp. 31-42, 1989 and Efficient Asset Management: A Practical Guide to Stock Portfolio Optimization and Asset Allocation, Harvard Business School Press, 1998, (the two Michaud publications are hence referred to collectively as "Michaud") all of which are incorporated by reference herein in their entirety.

A number of procedures have been proposed to alleviate this sensitivity problem. Michaud proposes using bootstrap resampling based on estimates of asset return, variance, and covariance to generate a distribution of efficient frontiers. R. Jagannathan and T. Ma, "Risk Reduction in Large Portfolios: Why Imposing the Wrong Constraints Helps", Journal of Finance, Vol. 58, pp. 1651-1683, 2003, consider restrictions on portfolio weights as a way to improve portfolio construction. A Bayesian approach in which the input parameters are modified towards plausible values has been made popular by F. Black, and R. Litterman, "Global Portfolio Optimization", Financial Analysts Journal, pp. 28-43, 1992.

More recently, mathematical techniques in robust optimization have been used to explicitly model and compensate for estimation error in portfolio risk and, where appropriate, return. The upside of robust portfolio optimization is that large arbitrage-like bets that are sensitive to model parameters can be avoided. The downside is that too much conservativeness leaves real opportunities unexploited.

Robust portfolios are constructed by solving a quadratic min-max problem with quadratic constraints. Technical details for solving such problems are given in A. Ben-Tal, and A. Nemirovski, "Robust Convex Optimization", Mathematics of Operations Research, Vol. 23, pp. 769-805, 1998, which is incorporated by reference herein in its entirety. Robust optimization techniques have been applied to financial problems by M. S. Lobo, "Robust and Convex Optimization with Applications in Finance", Stanford University dissertation, 2000, and D. Goldfarb, and G. Iyengar, "Robust Portfolio Selection Problems", Mathematics of Operations Research, Vol. 28, pp. 1-37, 2003, both of which are incorporated by reference herein in their entirety.

From the above, it is seen that there is a recognition that it is important to consider and compensate for estimation and modeling errors in risk when analyzing and constructing financial portfolios. Although conceptually it is possible to distinguish modeling error, which is error due to specifying the model, and estimation error, which is error due to measurement and data errors, in practice, the two sources of error are indistinguishable and must be handled by the same techniques.

Suppose that there are N assets in an investment portfolio, and the weight or fraction of the available wealth invested in each asset is given by the N-dimensional column vector w. These weights may be the actual fraction of wealth invested or, alternatively, in the case of active risk, they may represent the difference in weights between a managed portfolio and a benchmark portfolio as described by Litterman. The risk of this portfolio is calculated, using standard matrix notation, as $$V = w^T Q w$$

where V is the portfolio variance, a scalar quantity, and Q is an N×N positive semi-definite matrix whose elements are the variance or covariance of the asset returns.

Expected covariances of security returns are difficult to estimate. For N assets, there are N(N+1)/2 separate variances and covariances to be estimated. The number of securities that may be part of a portfolio, N, is often over a 1000, which implies that over 500,000 values must be estimated. Risk models typically cover all the assets in the asset universe, not just the assets with holdings in the portfolio, so N can be considerably larger than the number of assets in a managed or benchmark portfolio.

To obtain reliable variance or covariance estimates based on historical return data, the number of historical time periods used for estimation should be of the same order of magnitude as the number of assets, N. Often, there may be insufficient historical time periods. For example, new companies and bankrupt companies have abbreviated historical price data and companies that undergo mergers or acquisitions have non-unique historical price data. As a result, the covariances estimated from historical data can lead to matrices that are numerically ill-conditioned. Such covariance estimates are of limited value.

Factor risk models were developed, in part, to overcome these short comings. See for example, R. C. Grinold, and R. N. Kahn, Active Portfolio Management: A Quantitative Approach for Providing Superior Returns and Controlling Risk, Second Edition, McGraw-Hill, New York, 2000, which is incorporated by reference herein it its entirety, and Litterman.

Factor risk models represent the expected variances and covariances of security returns using a set of M factors, where $M \ll N$, that are derived using statistical, fundamental, or macro-economic information or a combination of any of such types of information. Given exposures of the securities to the factors and the covariances of factor returns, the covariances of security returns can be expressed as a function of the factor exposures, the covariances of factor returns, and a "remainder", called the specific risk of each security. Factor risk models typically have between 20 and 80 factors. Even with 80 factors and 1000 securities, the total number of values that must be estimated is just over 85,000, as opposed to over 500,000.

A substantial advantage of factor risk models is that since, by construction, $M \ll N$ factor risk models do not need as many historical time periods to estimate the covariances of factor returns and thus are much less susceptible to the ill-conditioning problems that arise when estimating the elements of Q individually. However, the fact that $M \ll N$ is also a disadvantage of factor risk models: the null-space of factor exposures is non-empty, which means that the factor risk model cannot capture certain risk information. Although all elements in the asset covariance matrix are estimated, the factor risk model cannot accurately estimate all possible variance/covariance matrices as the number of factors is much smaller than the number of assets. Furthermore, the accuracy of the model depends on the choice of factors and there are a huge number of possible choices for factors. This deficiency can be thought of as modeling error and is inherent in factor risk models. Additional inaccuracies are introduced due to errors when the parameters of the factor risk model are estimated.

This modeling error manifests itself when a factor risk model is used to estimate the risk of an investment portfolio, or to compute an investment portfolio using mean-variance optimization. In the first case, the estimated portfolio risk may be inaccurate. In the second case, the resulting portfolio may not be optimal.

Accordingly, among its several aspects, the present invention recognizes that there remains a need for systems and methods that can efficiently and effectively estimate Q by explicitly accounting for modeling and estimation error in factor risk models.

United States Patent Publication No. 2002/0123953 describes an approach in which a factor risk model may be altered by specifying an uncertainty set and confidence threshold for the factor loading or exposure matrix, B, and factor covariance matrix, Σ. However, the uncertainty set described is general and does not specifically depend on the linear algebraic properties of the exposure matrix, B. In United States Patent Publication No. 2004/0236546, the alterations to the risk model are said to be independent of the mathematical structure of B. By contrast, in the present invention, the alterations to improve the risk model specifically depend on the linear algebraic properties of the exposure matrix, such as the null space of this matrix.

SUMMARY OF THE INVENTION

Among its several aspects, the present invention recognizes that typical prior art approaches are subject to various deficiencies. By way of example, current factor risk models may not be sufficiently accurate. Current factor risk models may inherently have modeling error due to how they are constructed which is generally ignored and not compensated for. Current factor risk model systems may provide variance and covariance estimates with no indication of what the error in those estimates might be. Such information would be helpful when analyzing the risk of portfolios or constructing investment portfolios. Current factor risk models may underestimate the risk of particular families of investment portfolios. Portfolios created with feedback from a factor risk model tend to reduce the exposure to the factors in the risk model. Even though this reduction in exposure does indeed reduce risk, it typically does not reduce it to the extent predicted by the risk model. For example, it is possible to reduce the exposure to the "size factor" by offsetting large cap holdings with small cap holdings. Being size neutral, though, does not mean that risk has been completely eliminated. Current factor risk models may not compensate for the fact that the null space of the factor exposures is non-empty, which implies that asset covariances cannot be accurately determined.

The present invention describes new and improved methods for modeling, parameterizing, estimating, and compensating for the error in portfolio risk when using factor risk models, where the error could be from either estimation or modeling errors.

According to one aspect of the present invention, compensation is provided for modeling error in factor risk model estimates for asset variances and covariances. This numerical compensation is dependent on the mathematical structure of the exposure matrix, and the magnitude of the compensation can be adjusted depending on the portfolio holdings and the historical performance of an investment strategy.

This aspect of the invention corrects an existing factor risk model by identifying one or more "missing" or unspecified factors that account for modeling error. As addressed further below, the present invention recognizes that since covariances of security returns are represented as a function of factor exposures, factor return covariances, and specific security risks, inaccuracies in covariances of security returns may be modeled by additional unknown factors and associated security exposures. The level of covariance inaccuracies is controlled by the exposures to the unknown factors, the correlations between existing and unknown factors, and the variance of the unknown factors. Determining these answers identifies the missing or unspecified factors.

According to a further aspect, the present invention addresses a computer based method of modifying a fully specified factor risk model whose elements are known deterministically or probabilistically, comprising: computing an adjustment to the fully specified factor risk model that adjusts both the factor risk and the specific risk of a portfolio and whose properties are dependent on the mathematical structure of the exposure matrix; estimating a magnitude for this adjustment dependent on the portfolio being analyzed and the historical performance of its investment strategy so that when it is added to the fully specified factor risk model it improves the factor risk model; and utilizing the modified factor risk model to calculate an adjusted risk estimate for the portfolio.

In another aspect, the present invention addresses a computer based method for determining a model uncertainty metric in a space of portfolios, said portfolios being vectors with elements corresponding to holdings in said portfolios; said model uncertainty metric depending on the null space of the transpose of a matrix of factor loadings or factor exposures; and a particular portfolio to be analyzed; and utilizing the model uncertainty metric to adjust a measure of portfolio performance.

Further, the invention may be suitably implemented as computer software stored on a storage medium, said software operating to modify a fully specified factor risk model whose elements are known deterministically or probabilistically, by: computing an adjustment to the fully specified factor risk model that adjusts the factor risk or the specific risk of a portfolio and whose properties are dependent on the mathematical structure of the exposure matrix; estimating a magnitude for this adjustment dependent on the portfolio being analyzed and the historical performance of an investment strategy so that when the adjustment is added to the fully specified factor risk model the adjustment improves the factor risk model; and utilizing the modified factor risk model to calculate an adjusted risk estimate for the portfolio.

A more complete understanding of the present invention, as well as further features and advantages of the invention, will be apparent from the following Detailed Description and the accompanying drawings.

BRIEF DESCRIPTION OF THE DRAWINGS

FIG. 1 shows a computer-based system which may be suitably utilized to implement the present invention;

FIG. 3 illustrates a flowchart of a third process in accordance with the present invention; and FIGS. 4A and 4B are tables each of which illustrates a comparison of an exemplary risk factor model not utilizing the present invention with an exemplary modified risk factor model in accordance with the present invention.

DETAILED DESCRIPTION

Figure 2A:
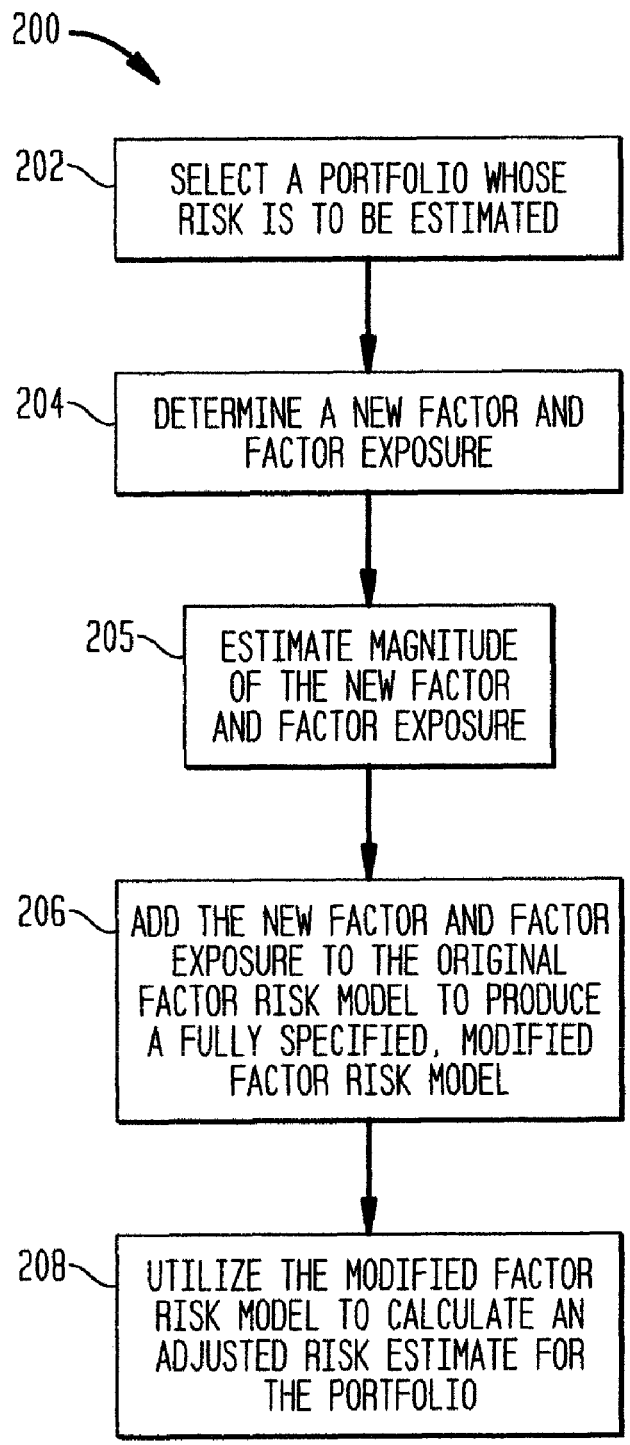
FIG. 2A illustrates a flowchart of a first process in accordance with the present invention.

The present invention may be suitably implemented as a computer-based system, in computer software which resides on computer readable media, such as solid state storage devices, such as RAM, ROM, or the like, magnetic storage devices such as a hard disk or floppy disk media, optical storage devices, such as CD-ROM or the like, or as methods implemented by such systems and software.

FIG. 1 shows a block diagram of a computer system 100 which may be suitably used to implement the present invention. System 100 is implemented as a computer 12, such as a personal computer, workstation, or server. One likely scenario is that the system of the invention will be implemented as a personal computer or workstation which connects to a server or other computer running software to implement the processes of the present invention either through a network, Internet or other connection. As shown in FIG. 1 and described in further detail below, the system 100 includes software that is run by the central processing unit of the computer 12. The computer 12 may suitably include a number of standard input and output devices, including a keyboard 14, a mouse 16, CD-ROM drive 18, disk drive 20, monitor 22, and printer 24. In addition, the computer 12 may suitably include an Internet or network connection 26 for downloading software, data and updates or for providing outputs to remote system users. It will be appreciated, in light of the present description of the invention, that the present invention may be practiced in any of a number of different computing environments without departing from the spirit of the invention. For example, the system 100 may be implemented in a network configuration with individual workstations connected to a server. Also, other input and output devices may be used, as desired. For example, a remote user could access the server with a desktop computer, a laptop utilizing the Internet or with a wireless handheld device such as a Blackberry™, Treo™, or the like.

One embodiment of the invention has been designed for use on a stand-alone personal computer or workstation with an Intel Xeon, Pentium, or later microprocessor, using as an operating system Debian GNU/Linux 3.1 (or later versions). This embodiment of the invention employs approximately 128 MB of random-access memory.

According to one aspect of the invention, it is contemplated that the computer 12 will be operated by a user, such as a portfolio manager, an investment advisor or investor in an office setting. However, if desired, it would also be possible to practice the invention with the user using an off-site computer and either loading the below-described software onto the off-site computer or connecting to a server computer running the software. In the situation in which the computer 12 is operated by an investment advisor, that advisor may receive information from a client or clients, for example, by having the client fill out a form, by conducting an interview, or the like addressing the client's requirements regarding acceptable risk, expected return, preferred investments, disfavored investments, and the like. For example, an investor may wish to maximize the return of his or her portfolio subject to having a maximum acceptable risk of 3%, prefer investment in large capitalization stocks, and not want to invest in Japanese equities, dotcom stocks, or some other investment where he or she had sustained a large loss in the past.

As illustrated in FIG. 1, and as described in greater detail below, additional inputs 28 may suitably include databases of historical data for backtesting and the like, data sources for assets which may be included in portfolios, such as the asset symbols, tickers, or identification numbers, the current prices of stocks, bonds, commodities, currencies, options, other investment vehicles, and the like, client data, such as current client portfolios, risk and return data, and the like. This data may also include historical information on macroeconomic variables, such as inflation and the rates for United States Treasury bonds of various maturities, for example. It will be recognized that a wide variety of additional inputs may be provided including without limitation other complementary or supplementary portfolio modeling software, such as portfolio optimization modeling software, for example.

As further illustrated in FIG. 1, and as described in greater detail below, the system outputs 30 may suitably include a measure of portfolio risk, a recommended new portfolio with an expected higher return, a recommended new portfolio having lower expected risk, or the like. The output information may appear on the monitor 22 or may also be printed out at the printer 24. The output information may also be electronically sent to a broker or some other intermediary for execution. Other devices and techniques may be used to provide outputs, as desired.

In the present embodiment of the invention, software is utilized to generate a number of computer display screens for receiving inputs from, and providing outputs to, a user of the system.

It is anticipated that the models of the present disclosure will be implemented in software. The software may be stored in any appropriate computer readable medium, such as RAM. The software may be executed on any appropriate computer system, such as the system 12 as shown in FIG. 1.

Before addressing the detailed mathematics of a presently preferred embodiment of the invention, several advantageous aspects of the present invention are described more generally. To this end, FIG. 2A illustrates several aspects of a process 200 in accordance with the present invention. Process 200 may be suitably implemented as software or in a computer-based system, such as the system 100 of FIG. 1. In a typical prior art factor risk model, the elements are known deterministically or probabilistically. As discussed above, such models when utilized to select a portfolio may underestimate the risk of the portfolio. Simply as an example, for an investor wanting to invest in a portfolio having an acceptable level of risk of no greater than 3%, the true risk may be actually closer to 5%. For a detailed discussion of a series of actual backtests on actual portfolios, see the discussion below in connection with FIGS. 4A and 4B, and Tables 1 and 2.

To address such problems, the process 200 begins at step 202, by selecting a portfolio whose risk is to be estimated. In step 204, a new factor and factor exposure are determined based on the mathematical properties of the exposure matrix of the factor risk model. In step 205, the magnitude of the new factor and factor exposure are determined for the portfolio whose risk is to be estimated. In step 206, the new factor and factor exposure determined in steps 204 and 205 are added to the fully specified factor risk model to produce a modified factor risk model. Finally, in step 208, the modified factor risk model is utilized to calculate an adjusted risk estimate for the portfolio.

Figure 2B:
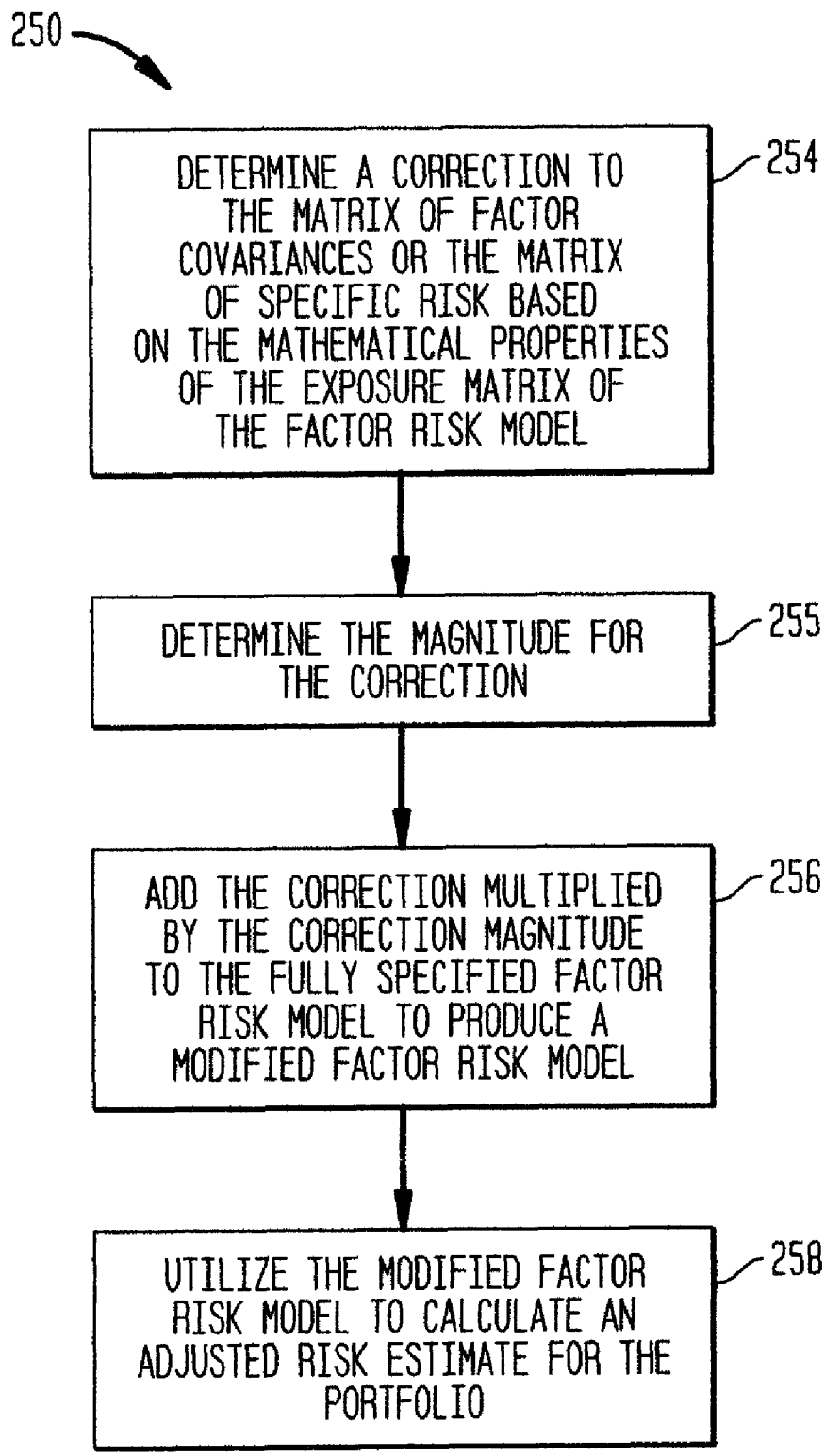
FIG. 2B illustrates a flowchart of a second process in accordance with the present invention.

A second process 250 in accordance with the present invention is illustrated in FIG. 2B. Like process 200, process 250 may be suitably implemented as software or in a computer-based system, such as the system 100 of FIG. 1. In step 254, a correction to the matrix of factor covariances or the matrix of specific risk is determined based on the mathematical properties of the exposure matrix of the factor risk model. This correction is generally expressed in terms of matrices. In step 255, the magnitude for the correction is determined. In step 256, the correction multiplied by the correction magnitude is added to the fully specified factor risk model to produce a modified factor risk model. Finally, in step 258, the modified factor risk model is utilized to calculate an adjusted risk estimate for the portfolio.

A third process 300 in accordance with the present invention is illustrated in FIG. 3. Like processes 200 and 250, process 300 may be suitably implemented as software or in a computer-based system, such as the system 100 of FIG. 1. The process 300 addresses a computer implemented method for determining measures of risk for investment portfolios. In step 302, a characteristic of a first investment portfolio, w, that causes a factor risk model with fixed risk factors to underestimate the risk for the first investment portfolio is identified. In step 304, a variable risk factor, or factors, which varies dependent upon the factor risk model and the first investment portfolio is determined. In step 305, the magnitude of the variable risk factor, or factors, is determined. In step 306, the variable risk factor determined in steps 304 and 305 is added to the factor risk model to compensate for said underestimated risk. In step 308, a second investment portfolio sharing the characteristic of the first investment portfolio is analyzed to determine a second modified risk model to produce a more accurate measure of risk for the second investment portfolio. Alternatively, in step 310, a sequence of portfolios is analyzed with a modified factor risk model determined for each portfolio to produce a new investment portfolio having a desired level of risk.

With this background in mind, we turn to a detailed mathematical discussion of a presently preferred embodiment of the invention and its context.

In a factor risk model, the asset covariance matrix is modeled as $$Q = B\Sigma B^T + \Delta^2$$

where

Q is an N×N covariance matrix

B is an N×M matrix of factor exposures (also called factor loadings)

Σ is an M×M matrix of factor covariances $\Delta^2$ is an N×N matrix of security specific risk variances It is assumed that M<<N, and it is also assumed that an N-dimensional column vector of portfolio weights w is known where w represents the fraction of available wealth invested in each asset or security or, for active risk, the difference in weights between a managed portfolio and a benchmark portfolio.

As with all estimated models, the model above for Q has modeling and estimation error. As a result, when Q is used to predict the risk of a portfolio, the resulting risk prediction may be inaccurate. For example, if risk is measured as the portfolio variance, $V = w^T Q w$, the estimate of variance V may be too small or too large for a particular portfolio w. Within the context of portfolio construction and optimal portfolio construction, portfolios are sought that minimize risk. Consequently, algorithms for portfolio construction and optimal portfolio construction may bias the portfolios they construct to include those for which the predicted risk is underestimated.

In many cases, a portfolio or a mathematical family of portfolios can be identified in which the risk prediction is suspected of being underestimated. For example, consider portfolios w that lie in the null space of $B^T$. That is to say, consider portfolios such that $B^T w = 0$. The variance predicted for such a portfolio is $V = w^T Q w = w^T B \Sigma B^T w + w^T \Delta^2 w = w^T \Delta^2 w$. In other words, for such a portfolio, there is only the specific risk associated with $\Delta^2$. No risk is associated with or attributable to the factors modeled by B and Σ. This risk estimate may be low because most portfolios have some risk associated with the factors that are not identified in this particular factor risk model.

Another possible family of portfolios whose risk prediction may be smaller than desired could be portfolios that are significantly different than the portfolio currently held by an investor. Even if the risk prediction of a portfolio that was very different than the current holdings was accurate, it may be desirable to increase the risk prediction associated with that portfolio in order to make such a portfolio less desirable to a portfolio construction algorithm to avoid the high transaction costs of significantly altering the portfolio.

In an analogous fashion, families of portfolios can be identified in which the risk prediction is too large. However, since most portfolios are constructed to minimize risk, such portfolios are normally of less practical interest.

For purposes of the discussion below, it is assumed that a family of portfolios have been identified for which it is believed that the risk estimate derived from the original factor risk model is underestimated. The goal of the present invention is to compensate for this prediction by modifying the factor risk model so that its predictions for that family of portfolios are larger. To do this, a modified factor risk model, $\tilde{Q}$ is constructed which includes an additional k factors:

$$\tilde{Q} = [B\ f_1\ f_2\ \ldots\ f_k] \begin{bmatrix} \Sigma & 0 & 0 & \ldots & 0 \\ 0 & \sigma_1^2 & 0 & \ldots & 0 \\ 0 & 0 & \sigma_2^2 & \ldots & 0 \\ \ldots & \ldots & \ldots & \ldots & \ldots \\ 0 & 0 & 0 & \ldots & \sigma_k^2 \end{bmatrix} [B\ f_1\ f_2\ \ldots\ f_k]^T + \Delta^2$$

where $f_i$, i=1, ..., k, are k N-dimensional column vectors of as yet unspecified factor exposures (also called factor loadings), and $\sigma_i^2$, i=1, ..., k, are k scalars that scale the variance magnitude of each unspecified factor. In the less practical case of compensating for overestimated risk, the scalars $\sigma_i^2$ may be negative.

The variance predicted by $\tilde{Q}$ is $$V = w^T \tilde{Q} w = w^T B \Sigma B^T w + \sum_{i=1}^{k} \sigma_i^2 (w^T f_i)^2 + w^T \Delta^2 w$$

The goal is to strategically determine the number of unspecified factors, k, the unspecified factor exposures $f_i$ and unspecified factor variances $\sigma_i^2$ so as to appropriately alter the risk prediction for those portfolios in the family of portfolios with incorrectly predicted risk. Once each of these has been specified, then $\tilde{Q}$ is fully determined and can be used to estimate risk.

In order to properly define k, $f_i$, and $\sigma_i^2$, a number of mathematical constraints are imposed. Some of these constraints may be arbitrary. For example, one may choose k=1 for ease of computation.

One constraint that has been found to work well is to require the unspecified factor exposures $f_i$ to belong to the same family as the portfolios whose variance is incorrectly estimated. Notice that in the expression for the additional variance created by adding the new unspecified factors, $$\sum_{i=1}^{k} \sigma_i^2 (w^T f_i)^2,$$

there is symmetry between the portfolio w and the new unspecified factor exposures, $f_i$. If one interchanges w and $f_i$, one obtains the same variance. Requiring $f_i$ and w to belong to the same family further reinforces this symmetry.

The constraints chosen to define k, $f_i$, and $\sigma_i^2$ may vary widely depending on the nature of the family of portfolios whose variance is underestimated.

There are a number of methods by which the number of unspecified factors and unspecified factor variances $\sigma_i^2$ can potentially be specified. The choice of the most appropriate value will depend on the purpose for which the new factor risk model is used.

In the context of portfolio analysis, the number of unspecified factors and total unspecified factor variance or the individual unspecified variances themselves may be prescribed arbitrarily. For example, the total unspecified variances, $$\sum_{j=1}^{k} \sigma_j^2,$$

could be arbitrarily set as a fixed ratio of the total specific variance of a benchmark portfolio, or a fixed fraction of the total variance, or to a predetermined constant.

Alternatively in the context of optimal portfolio construction strategies, the best choices for these parameters may be determined by running backtests on historical data to determine acceptable, strategic or optimal choices.

In order to further illustrate the invention disclosed herein, the specific details are described for one particular family of portfolios whose variance is likely to be underestimated.

Consider the family of portfolios that lie in the null space of $B^T$ (i.e., $B^T w = 0$). For simplicity, assume also that only one factor (k=1) is to be employed, and $\sigma_1^2$ is set equal to some fixed constant. In this example, the unspecified factor exposure $f_1$ is required to lie in the null space of $B^T$ (i.e., $B^T f_1 = 0$). $f_1$ is normalized such that $\|f_1\|=1$, where $\|\ \|$ represents a suitable norm in the N-dimensional vector space of $f_1$. While these constraints help determine possible solutions for $f_1$, they do not completely specify $f_1$. The null space of $B^T$ has at least N-M dimensions, so there are many possible vectors that are potential candidates for $f_1$. The definition of $f_1$ is finalized by requiring it to be the vector that maximizes $w^T \tilde{Q} w$ for any given w. This requirement is equivalent to choosing $f_1$ to maximize $(w^T f_1)^2$.

For this particular example, then, $\tilde{Q}$ is defined by the constraints:
w prescribed and fixed
k=1
$\sigma_1^2$=a fixed constant
$B^T f_1 = 0$
$\|f_1\|=1$
$f_1$ maximizes $(w^T f_1)^2$ By selecting the $f_1$ that maximizes the underestimated risk compensation in all cases, a portfolio optimization or construction algorithm will have difficulty finding a portfolio from the family of underestimated risk portfolios in which the risk is not compensated.

This particular formulation of the problem enjoys the advantage of having a closed-form solution. In fact, the solution for $f_1$ is the normalized projection of w into the null space of $B^T$. To better see this, denote the projection matrix into the null space of $B^T$ by $P_{N(B^T)}$ and define $y=P_{N(B^T)}w$. Then, the solution to the problem of maximizing $w^T \tilde{Q} w$ or equivalently $(w^T f_1)^2$ as specified above is $f_1 = \pm y/\|y\|$, and the additional variance is $\sigma_1^2 w^T f_1 f_1^T w = \sigma_1^2 w^T P_{N(B^T)} w$. The projection matrix can be written as $P_{N(B^T)} = I - B(B^T B)^+ B^T$ where $X^+$ indicates the pseudo-inverse of X and I is the identity matrix. Hence, $$\sigma_1^2 w^T f_1 f_1^T w = \sigma_1^2 (w^T w - w^T B(B^T B)^+ B^T w) \quad 5$$

Using the fact that $P = P^2$ for projection matrices, this expression can be written as $$\sigma_1^2 w^T f_1 f_1^T w = \sigma_1^2 y^T y \quad y = w - B(B^T B)^+ B^T w$$

This gives the closed form expression for $f_1$ in terms of w and B.

This same closed-form solution can be written as a modification of the original factor risk model matrices as follows:

(1) The original factor risk model factor covariance matrix $\Sigma$ is replaced by the modified factor covariance matrix $\Sigma' = \Sigma - \sigma_1^2 (B^T B)^+$ (2) The original factor risk model specific variance matrix $\Delta^2$ is replaced by the modified specific variance matrix $(\Delta^2)' = \Delta^2 + \sigma_1^2 I$ For this particular closed-form solution, the modification of the factor risk model therefore only depends on B and the user's choice for the correction magnitude, $\sigma_1$. The new factor, $f_1$, need not be explicitly computed.

If no closed-form solution exists for $\tilde{Q}$, a numerical solution can be found by, for example, using a general numerical optimization routine.

Although the invention has been illustrated for one particular example, there are many alternative ways in which the revised factor risk model may be specified. For example, one could specify: k=2, $\sigma_1^2 + \sigma_2^2 \leq 0.1$, $f_1^T f_1 = 1$, $f_2^T f_2 = 1$, $f_1^T f_2 = 0$, $B^T f_1 = 0$, $B^T f_2 = 0$, and choose $f_1$ and $f_2$ to maximize $\sigma_1^2 (w^T f_1)^2 + \sigma_2^2 (w^T f_2)^2$. This particular definition may or may not have a closed-form solution.

In some cases, it may be preferable to use the alternative risk estimate provided by this invention to improve portfolio construction but to continue to use the original risk model to formally estimate the risk of the portfolio in performance attribution. Since risk estimates utilized by performance attribution are often used to evaluate fund managers, it is important that the definition of risk to be used by such attribution be unambiguous. Having two risk models could potentially add ambiguity to a manager's evaluation.

In such cases, it may be preferable to restate the portfolio construction and risk estimate problems solved by this invention in an alternative mathematical format. Specifically, the mathematical statement of the portfolio construction problem with adjusted risk is the following:

Outer Maximization/Portfolio Construction to Determine w maximize $w^T \alpha$ (the expected return)

subject to $w^T 1 = 1$ (the budget constraint)

$w^T \bar{Q} w \leq \sigma_0^2$ (the original risk budget)

$(f_1^T w)^2 \leq \sigma_1^2$ (the adjusted risk budget)

Inner Maximization/Risk Estimation to Determine $f_1$ maximize $(f_1^T w)^2$ subject to $\|f_1\| = 1$ $B^T f = 0$ where w = an N dimensional column vector of portfolio weights (typically active weights)

$f_1$ = an N dimensional column vector giving the new factor $\alpha$ = an N dimensional column vector of expected returns 1 = an N dimensional column vector of all ones $\bar{Q}$ = an N×N matrix of asset covariances $\sigma_0^2$ = the original risk budget, still to be used for performance attribution $\sigma_1^2$ = the adjusted risk budget, independent of performance attribution B = an N×M matrix of asset exposures or factor loadings By solving the problem in this way, the portfolio construction process selects portfolios with limited risk associated with the factor $f_1$ while simultaneously allowing the portfolio to have the full risk budget associated with the original risk model. In this statement of the invention, there is no adjusted risk model that can be confused with the original risk model. The term $(f_1^T w)^2$ can be called a metric of model uncertainty.

The underestimation of risk for portfolios lying in the null space of $B^T$ is illustrated below with a specific simplified numerical example. In this example, it is assumed that there are five stocks: A, B, C, D, and E in an investment portfolio, and the true asset-asset covariance matrix for these five stocks is given by $Q_{true}$ below:

$$Q_{true} = \begin{bmatrix} 0.20 & 0.065 & 0.015 & -0.055 & -0.17 \\ 0.065 & 0.045 & 0.0075 & -0.0175 & -0.055 \\ 0.015 & 0.0075 & 0.045 & 0.0075 & 0.015 \\ -0.055 & -0.0175 & 0.0075 & 0.0289 & 0.065 \\ -0.17 & -0.055 & 0.015 & 0.065 & 0.1936 \end{bmatrix}$$

where the rows and columns of $Q_{true}$ correspond to the assets A, B, C, D, and E in that order. In other words, the variance of A is the element in row 1, column 1, 0.20; the covariance of A and B is the element in row 1, column 2, 0.065; and so on.

Assume we wish to compute the risk for a portfolio whose wealth is distributed as 0% in asset A, 23.82% in asset B, 22.47% in asset C, 13.10% in asset D, and 40.61% in asset E. In vector notation, this asset allocation corresponds to the vector $$w = \begin{bmatrix} 0 \\ 0.2382 \\ 0.2247 \\ 0.1310 \\ 0.4061 \end{bmatrix}$$

The true variance of this portfolio is given by $V_{true} = w^T Q_{true} w = 0.03641$, which corresponds to a volatility of 19.08%. The volatility of a portfolio is the square root of its variance, and the risk of a portfolio is often expressed in terms of volatility rather than variance.

Now consider a one-factor, factor risk model that models $Q_{true}$. In this example, market capitalization of the stocks has been chosen as the factor, and it is further assumed that the market capitalization of the stocks increases from A, the smallest, to E, the largest. In order to closely match the true asset-asset covariance matrix, $Q_{true}$, the following factor risk model has been chosen for purposes of illustration:

Factor exposures:

$$B = \begin{bmatrix} -3 \\ -1 \\ 0 \\ 1 \\ 3 \end{bmatrix}$$

Factor-factor covariance: $\Sigma = [0.021]$
Specific risk:

$$\Delta^2 = \begin{bmatrix} 0.010404 & 0 & 0 & 0 & 0 \\ 0 & 0.023409 & 0 & 0 & 0 \\ 0 & 0 & 0.0441 & 0 & 0 \\ 0 & 0 & 0 & 0.007396 & 0 \\ 0 & 0 & 0 & 0 & 0.004096 \end{bmatrix}$$

For this one-factor model, the modeled asset-asset covariance matrix is $$Q_{one-factor} = \begin{bmatrix} 0.1994 & 0.063 & 0 & -0.063 & -0.189 \\ 0.063 & 0.04441 & 0 & -0.021 & -0.063 \\ 0 & 0 & 0.0441 & 0 & 0 \\ -0.063 & -0.021 & 0 & 0.0284 & 0.063 \\ -0.189 & -0.063 & 0 & 0.063 & 0.1931 \end{bmatrix}$$

Note that the elements lying along the diagonal of $Q_{one-factor}$ and on many of the off-diagonal elements are similar to the elements of the true asset-asset covariance matrix $Q_{true}$. However, there are a number of off-diagonal elements that are not very similar in these two matrices. This dissimilarity occurs because the one-factor factor-risk model is only an approximation of the true asset-asset covariance matrix.

For the one-factor risk model, the variance of the portfolio w is $V_{one-factor} = w^T Q_{one-factor} w = 0.03028$, which corresponds to a volatility of 17.40%. This volatility value underestimates the true value of 19.08%.

When we compute $B^T w$ we obtain the vector 1.111, so w does not fully lie in the null space of $B^T$. Nevertheless, the approach of the present invention can be used to correct the factor risk model for this particular portfolio, w, using the null-space factor adjustment method as described above. Specifically, the following constraints are utilized:

k=1
$\sigma_1^2 = 1$
$B^T f_1 = 0$
$\|f_1\| = \sqrt{f_1^T f_1} = 0.15$
$f_1$ maximizes $(w^T f_1)^2$ for the w given above.

The solution for the new factor exposure to this problem for this particular w is $$f_1 = \begin{bmatrix} 0.052404 \\ 0.092362 \\ 0.070659 \\ 0.02371 \\ 0.075288 \end{bmatrix}$$

Note that as discussed above, the factor exposure to add depends on the portfolio whose variance is to be estimated. For a different w, the factor exposure that is added may be different than the $f_1$ determined for this example.

For any given w, the corrected factor risk model, asset-asset covariance matrix, $Q_{corrected}$, is not unique. For the above example, it can be calculated in terms of the projection matrix as $Q_{corrected} = Q_{one-factor} + \sigma_1^2 \|f_1\|^2 [I - B(B^T B)^+ B^T]$. For this formula, we obtain $$Q_{corrected} = \begin{bmatrix} 0.21178 & 0.05963 & 0.00000 & -0.05963 & -0.17888 \\ 0.05963 & 0.06578 & 0.00000 & -0.01988 & -0.05963 \\ 0.00000 & 0.00000 & 0.06660 & 0.00000 & 0.00000 \\ -0.05963 & -0.01988 & 0.00000 & 0.04977 & 0.05963 \\ -0.17888 & -0.05963 & 0.00000 & 0.05963 & 0.20547 \end{bmatrix}$$

If, on the other hand, we calculate it using the formula $Q_{corrected} = Q_{one-factor} + \sigma_1^2 f_1 f_1^T$, we obtain $$Q_{corrected} = \begin{bmatrix} 0.20215 & 0.06784 & 0.00370 & -0.06176 & -0.18505 \\ 0.06784 & 0.05294 & 0.00653 & -0.01881 & -0.05605 \\ 0.00370 & 0.00653 & 0.04909 & 0.00168 & 0.00532 \\ -0.06176 & -0.01881 & 0.00168 & 0.02896 & 0.06479 \\ -0.18505 & -0.05605 & 0.00532 & 0.06479 & 0.19876 \end{bmatrix}$$

The values of the corrected variance and volatility are unique. For either $Q_{corrected}$ given above, the variance of the portfolio w is $V_{corrected} = w^T Q_{corrected} w = 0.0354$, which corresponds to a volatility of 18.82% which is much closer to the true value of 19.08%.

The differences between an unmodified risk factor model and a modified risk factor model in accordance with the present invention with one unspecified factor have been evaluated using two series of backtests. For each backtest, portfolios were constructed using a long-short, dollar-neutral, maximize return portfolio management strategy over a period of ten years with monthly rebalancings. In each portfolio generated by the monthly rebalancings, there were between 900 and 1500 equities chosen from an asset universe of approximately 1800 equities. The actual number of equities varied from month to month depending on the events of the preceding month, such as mergers, IPOs, bankruptcies, and the like. In addition to the risk and the dollar-neutrality constraints, asset bounds of plus or minus 5% were imposed and the long and short holdings in each industry were restricted to be no more than 25%. Total long holdings were limited to 100% and turnover (buys plus sells) for each monthly rebalance was limited to 150%. In the first set of backtests, the goal was to limit risk to 3 percent. In the second set of backtests, the goal was to limit the risk to 6 percent.

A single missing factor orthogonal to the existing factors was assumed. Backtesting revealed that a good value for the variance of the unspecified factor was $\sigma_1^2 = 0.16$ with $\|f_1\| = 1$.

For each level of risk, three separate backtests were performed to evaluate the performance of the model.

In the first set of backtests in which the goal was to limit risk to 3 percent, the first backtest was performed with the original factor risk model and no additional factors. At the end of the 10 year backtest with monthly rebalancings, the realized portfolio return and risk were computed. In addition, the Sharpe ratio, the ratio of the return to realized risk, was computed. In general, larger Sharpe ratios indicate superior performance.

The difference in the backtest results without and with the unspecified factor can be demonstrated either by comparing the realized annual risk or by comparing the Sharpe ratio of the results. The results for the first back test are given on the first line of Table 1A which is labeled backtest 1. For this backtest, the realized annual return was 10.77% and the realized annual risk was 4.84%, giving a Sharpe ratio of 2.23.

This backtest illustrates that the maximum estimated risk using the original 3% risk model is underestimated for these optimized portfolios since the realized risk is 4.84%. One possible approach to improving the prediction is to artificially reduce the risk allowed for the maximum estimated risk. For example, since risk was underestimated by approximately 38%, one could simply reduce the maximum allowable estimated risk by approximately 38% so that the realized risk would hopefully become approximately 3%, assuming all other things were constant. The second row illustrates the results of conducting this experiment. When the maximum allowable risk is set to a value 40% below 3%, or 1.8% in the table, the realized risk now becomes 2.95%, which is close to the original risk budget of 3%. For this backtest, the realized annual return was 7.25%, so that the resulting Sharpe ratio was 2.46. In terms of Sharpe ratio, this backtest was superior to the first because of the larger Sharpe ratio.

Finally, rather than simply reducing the effective estimated risk budget, in the third backtest, the estimated risk budget was kept at 3%, but now the additional factor was added to the risk model. The results of this backtest are shown on the third line of Table 1A, marked backtest 3. For this backtest, the annual return was 8.32% and the annual realized risk was 3.05%, a far more accurate risk result than shown in backtest 1. The Sharpe ratio for this backtest was 2.73, a significant improvement over both the first and second backtests. Hence, for this set of three backtests, adding one new factor to the risk model was both more accurate and superior to either using the unmodified risk model or simply reducing the original budget for estimated risk.

TABLE 1A

The first set of backtests.

| Backtest | Maximum Estimated Risk | Number of Unspecified Factors | Annual Return | Annual Realized Risk | Sharpe Ratio |
|---|---|---|---|---|---|
| 1 | 3% | 0 | 10.77% | 4.84% | 2.23 |
| 2 | 1.8% | 0 | 7.25% | 2.95% | 2.46 |
| 3 | 3% | 1 | 8.32% | 3.05% | 2.73 |

A second set of backtests similar to those in Table 1A is shown in Table 1B. In this set of backtests, the nominal maximum estimated risk was 6%. Backtest 4 shows the results for the original factor risk model with a risk budget of 6%. Backtest 5 shows the same risk model with a reduced risk budget of 4% chosen to make the realized risk close to 6%. Finally, backtest 6 shows the results using an additional risk factor.

In this set of backtests, the reduced risk budget, backtest 5, performs worse than the original backtest in that the observed Sharpe ratio was reduced from 2.11 to 2.04. However, as in the results shown in Table 1A, the Sharpe ratio for the risk model with one added factor was significantly higher than either of the other two tests. In addition, the prediction of realized risk was more accurate.

TABLE 1B

The second set of backtests.

| Backtest | Maximum Estimated Risk | Number of Unspecified Factors | Annual Return | Annual Realized Risk | Sharpe Ratio |
|---|---|---|---|---|---|
| 4 | 6% | 0 | 16.77% | 7.93% | 2.11 |
| 5 | 4% | 0 | 12.41% | 6.08% | 2.04 |
| 6 | 6% | 1 | 14.84% | 6.15% | 2.41 |

In order to get a better sense for the kinds of differences that occurred in the backtests described above, FIG. 4A shows a distribution 400 of the top three and bottom two holdings in two portfolios 410 and 420 that are estimated to have 3% risk. On the left, the risk estimation is made with the unadjusted factor risk model. On the right, the risk estimate is made with a factor risk model with one, dynamic factor added. As can be seen in FIG. 4A, the holdings are different for the two portfolios. With no adjustment, 1.84% of the portfolio 410 is held in shares of Public Service Enterprise Group Inc., a stock listed on the New York Stock Exchange, under the symbol PEG and −3.77% of the portfolio 410 is held in shares of Apartment Investment & Management Co., a stock listed on the New York Stock Exchange under the symbol AIV. These are the largest positive and largest negative holdings. A positive holding represents a long position in the stock and a negative holding representing a short position in the stock. For the adjusted risk model, portfolio 420 has a top positive holding of 0.51% in ticker Valero Energy Corp. (VLO) and the top negative holding is −0.70% in AIV. In the portfolio 420 for the adjusted risk model, there may be non-zero holdings in tickers PEG, BXP, CEI, and CNA which are not listed. However, these holding percentages, if any, lie between the top positive and top negative holdings listed.

FIG. 4B shows the distribution 425 of the top six and bottom five holdings 430 for the portfolio 410 after the first month's rebalancing using the unmodified or unadjusted risk model. These holdings 430 include portfolio weights for tickers PEG, BXP, CEI, ED, FCE/A, TXU, HCP, AYE, NYB, CNA and AIV. FIG. 4B also shows the top six and bottom five holdings 440 for the portfolio 410 after rebalancing with the modified risk or adjusted risk model. It is noted that the holdings 440 of all of these particular tickers have decreased.

An additional backtest example follows below. For each backtest in this further example, the portfolios were constructed using a long-only, fully invested, maximize return portfolio management strategy over a period of ten years with monthly rebalancings. In each portfolio generated by the monthly rebalancing, there were between 90 and 850 equities chosen from an asset universe of approximately 1000 equities. The actual number of equities available to select changed from month to month depending on the events of the preceding month such as mergers, IPOs, bankruptcies, and the like. The only constraints were the active risk constraint, and the long-only, fully invested constraints. The goal was to limit active risk versus a benchmark to 3 percent. The benchmark was chosen as the market portfolio of the top 1000 stocks by market capitalization.

A single missing factor orthogonal to the existing factors was assumed, in other words, factor exposures in the null space of $B^T$. Backtesting revealed that a good value for the variance of the unspecified factor was $\sigma_1^2 = 0.04$ and $\|f_1\| = 1$.

Initially, a factor risk model was used without accounting for modeling error. Subsequently, modeling error was explicitly accounted for by incorporating a single unknown factor.

The difference in the backtest results without and with the unspecified factor can be demonstrated either by comparing the realized annual risk or by comparing the Sharpe ratio of the results.

The realized annual risk was 3.33% when modeling error was ignored whereas it was 2.92% when modeling error was explicitly accounted for. These results indicate that the risk predictions modeled using one unspecified factor are more accurate than those modeled without an unspecified factor.

The Sharpe ratio of the modified risk model results was substantially higher than with the original unmodified risk model. The Sharpe ratio increased from 2.11 to 2.81. Within the context of investment portfolio analysis, larger Sharpe ratios indicate superior portfolio performance.

Hence, by both measures, the use of the modified factor risk model with one unspecified factor has improved the portfolio performance. The results of this further example are shown in Table 2 below.

TABLE 2

| Maximum Estimated Risk | Number of Unspecified Factors | Annual Return | Annual Realized Risk | Sharpe Ratio |
|---|---|---|---|---|
| 3% | 0 | 7.92% | 3.33% | 2.11 |
| 3% | 1 | 8.21% | 2.92% | 2.81 |

The modified risk model of the present invention is different from both traditional statistical risk modeling approaches and standard principal component analysis. In traditional statistical risk modeling approaches and principal component analysis, a single factor risk model is determined. There is no risk model correction with a variable correction magnitude that can be used to optimally adjust the risk model and its estimates of portfolio volatility.

By contrast, in the typical prior art approach, all components of the risk models are known in advance, including the probabilistic manner in which they vary. In other words, B, $\Sigma$, and $\Delta^2$, are all known in advance. They may vary probabilistically, but the complete specification is known in advance. For example, the variance of the asset may be normally distributed around a mean value with a known standard deviation.

In the present invention, additional factor covariances and factor exposures that will be added to the factor risk model are not known in advance and cannot be determined until a specific portfolio has been selected and analyzed to determine the factor covariances and factor exposures. In this sense, the additional factor or factors added to the risk model must be determined dynamically or on the fly.

While the present invention has been disclosed in the context of various aspects of presently preferred embodiments, it will be recognized that the invention may be suitably applied to other environments consistent with the claims which follow.

We claim:

1. A computer-based method comprising:
electronically inputting a set of N possible investment opportunities;
defining a vector space of N-dimensional vectors of all possible portfolios in the N investment opportunities, with vector elements corresponding to investment holdings in any investment portfolio;
electronically receiving by a programmed computer a factor risk model defined and calibrated for all possible portfolios in the N investment opportunities, said factor risk model comprising a matrix of factor exposures, a matrix of factor covariances, and a matrix of specific covariances;
electronically receiving by the programmed computer an estimate of expected investment returns defined by an N-dimensional vector whose elements may be nonzero or may be all zero;
determining an original measure of portfolio performance for any possible portfolio representing investments in the N investment opportunities that is a function of the portfolio, the factor risk model, and the expected investment returns utilizing the programmed computer;
defining an original portfolio optimization strategy for determining an optimized portfolio of investment holdings comprising an objective function and zero or more constraints on the portfolio in which at least the objective function or one of the constraints of the optimization strategy is a function of the optimized portfolio and the factor risk model or expected investment returns;
determining an N-dimensional new factor vector so that the vector inner product of said new factor and any column of said matrix of factor exposures substantially vanishes utilizing the programmed computer;
determining a modified portfolio optimization strategy in which the objective function or at least one of the constraints is altered by adding a constant times the absolute value of the vector inner product of the new factor and a portfolio determined by the modified portfolio optimization strategy raised to a power utilizing the programmed computer;
computing the optimal portfolio using the modified portfolio optimization strategy utilizing the programmed computer and portfolio optimization software; and
electronically outputting the optimized portfolio.

2. The method of claim 1 where the measure of portfolio performance is a variance, a risk, a tracking error, or an active variance of the optimized portfolio.

3. The method of claim 1 wherein said measure of portfolio performance is an expected return of the optimized portfolio.

4. The method of claim 1 wherein said measure of portfolio performance is a utility of the optimized portfolio.

5. The method of claim 1 wherein said measure of portfolio performance is a value at risk of the optimized portfolio.

* * * * *